United States Patent [19]
Tubbs

[11] Patent Number: 6,079,200
[45] Date of Patent: Jun. 27, 2000

[54] DUCTED FAN GAS TURBINE ENGINE WITH FAN SHAFT FRANGIBLE CONNECTION

[75] Inventor: Henry Tubbs, Tetbury, United Kingdom

[73] Assignee: Rolls-Royce plc, London, United Kingdom

[21] Appl. No.: 09/040,614

[22] Filed: Mar. 18, 1998

[30] Foreign Application Priority Data

Mar. 25, 1997 [GB] United Kingdom .................... 9706169

[51] Int. Cl.$^7$ .............................. F01D 25/16; F01D 5/02
[52] U.S. Cl. ......................... 60/226.1; 60/39.091; 415/9; 416/2; 416/170 R
[58] Field of Search ................................... 60/223, 226.1, 60/39.091; 415/9, 229; 416/2, 170 R

[56] References Cited

U.S. PATENT DOCUMENTS

| 3,395,857 | 8/1968 | Petrie . | |
|---|---|---|---|
| 4,201,513 | 5/1980 | Sales | 60/226.1 |
| 4,302,062 | 11/1981 | Hunter, Jr. . | |
| 4,452,567 | 6/1984 | Treby et al. | 60/226.1 |
| 4,475,869 | 10/1984 | Davies | 416/170 R |

FOREIGN PATENT DOCUMENTS

| 2002857 | 2/1979 | United Kingdom . |
|---|---|---|
| 2058245 | 4/1981 | United Kingdom . |
| 2114669 | 8/1983 | United Kingdom . |
| 2281105 | 2/1995 | United Kingdom . |

Primary Examiner—Ted Kim
Attorney, Agent, or Firm—W. Warren Taltavull; Farkas & Manelli PLLC

[57] ABSTRACT

A ducted fan gas turbine engine is provided with a fan which is carried by a shaft. Frangible fuse pins maintain the shaft carrying the fan coaxial with the engine longitudinal axis. In the event of severe fan damage, the fuse pins fracture and the fan shaft orbits about the engine longitudinal axis. A spoked resilient member is provided to exert a radially inward restoration force upon the fan shaft following such an event in order to reduce vibration.

6 Claims, 3 Drawing Sheets

DUCTED FAN GAS TURBINE ENGINE WITH FAN SHAFT FRANGIBLE CONNECTION

This invention relates to a ducted fan gas turbine engine for powering aircraft and is particularly concerned with the preservation of the integrity of such an engine following damage to its fan.

Ducted fan gas turbine engines are conventionally provided at their upstream ends with a comparatively large diameter propulsive fan which is driven by a core engine. The fan is thus vulnerable to damage as a result of foreign object ingestion by the engine. In most cases, the fan is sufficiently robust to withstand the effects of such foreign object ingestion without suffering major damage and is able to continue operating, although, perhaps, at reduced efficiency.

On very rare occasions, the fan may be damaged to such an extent that parts of one or more of the aerofoil blades that make up the fan are lost. This usually necessitates the shutting-down of the engine involved to minimise the hazard to the aircraft carrying it. However, the imbalance in the fan created by the blade loss initially generates extremely high loads which must, at least partially, be absorbed as the engine is allowed to run-down to windmilling speed. Windmilling speed is the speed at which the engine rotates in a non-operative condition as a result of its motion through the atmosphere.

One way in which fan imbalance load absorption can be achieved is to ensure that the relevant engine structures are sufficiently strong to tolerate the very high loads involved.

However, this results in a heavily reinforced structure both in the engine and aircraft which is undesirable from a weight point of view.

Another way in which fan imbalance load absorption can be achieved is by the use of so-called "fuse pins". Typically the main bearing supporting the shaft carrying the fan is connected radially to the remainder of the engine structure via a plurality of axially extending fuse pins. In the event of a major fan imbalance, the resultant high radial loads cause the fuse pins to fracture in shear to allow the fan and its shaft to orbit about the engine's longitudinal axis. This continues as the engine is allowed to run down to windmilling speed. Such arrangements are disclosed in GB2079402 and GB2130340.

Unfortunately, under certain circumstances, the vibration resulting from fan imbalance that still exists at windmilling speed can still be extremely severe. This is due mainly to the natural frequency of vibration of the fan and the lack of radial stiffness of the fan assembly following fuse pin fracture.

It is an object of the present invention to provide a ducted fan gas turbine engine in which the natural frequency of vibration of the fan at windmilling speeds following the fracture of such fuse pins is modified to reduce vibration.

According to the present invention, a ducted fan gas turbine engine includes a propulsive fan mounted on a shaft, which shaft is normally coaxial with said engine longitudinal axis, said fan shaft being supported radially by a bearing support structure which is in turn supported from fixed structure of said core engine by radially frangible connection means, and restoration means comprising a plurality of generally radially extending spokes interconnected at their radially inner extents by a common member which in turn engages said fan bearing support structure, each of said radially extending spokes slidingly engaging in a corresponding aperture in part of said engine fixed structure located radially outwardly of said fan bearing support structure, said spokes having sufficient resilience in bending as to ensure that they cooperate with said engine fixed structure to exert a radially inward restoration force upon said fan bearing support structure, and hence said fan shaft, subsequent to any radial excursion of at least part of said fan shaft relative to said engine longitudinal axis following any fracture of said frangible connection means.

Preferably, said apertures are at least partially defined by a common ring member.

Friction pads may be provided to engage said spokes and provide resistance to sliding movement of said spokes in their corresponding apertures.

Said friction pads may be spring biased into engagement with said spokes.

A pair of said friction pads may be located within each one of said apertures in opposed relationship.

Each of said spokes may be radially tapered.

The present invention will now be described, by way of example, with reference to the accompanying drawings in which.

Figure 1:
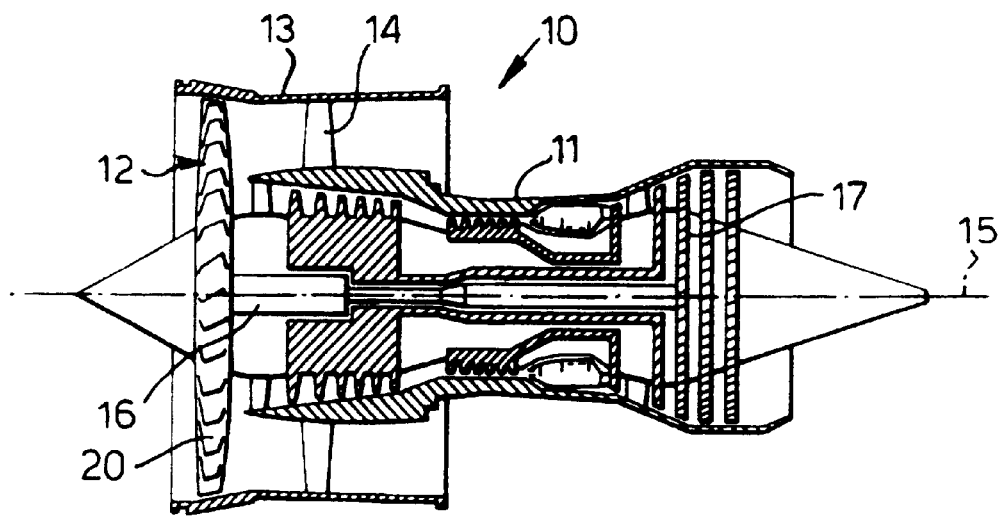
FIG. 1 is a schematic sectioned side view of a ducted fan gas turbine engine in accordance with the present invention.

With reference to FIG. 1, a ducted fan gas turbine engine generally indicated at 10 is of mainly conventional construction. It comprises a core engine 11 which functions in the conventional manner to drive a propulsive fan 12 positioned at its upstream end (the term "upstream" as used herein is with respect to the general direction of gas flow through the engine 10, that is, from left to right as viewed in FIG. 1). The propulsive fan 12 is positioned within a fan casing 13 which is supported from the core engine 11 by an annular array of outlet guide vanes 14. The ducted fan gas turbine engine 10 has a longitudinal axis 15 about which its major rotational parts rotate.

The fan 12 comprises a disc 19 which supports an annular array of generally radially extending aerofoil blades 20. The disc 19 includes an integral stub shaft 18 which facilitates the attachment of the fan 12 to the fan shaft 16. Under normal circumstances, the fan 12 and the fan shaft 16 are coaxial with the engine longitudinal axis 15 and are driven in the conventional way by the low pressure turbine portion 17 of the core engine 11.

Figure 2:
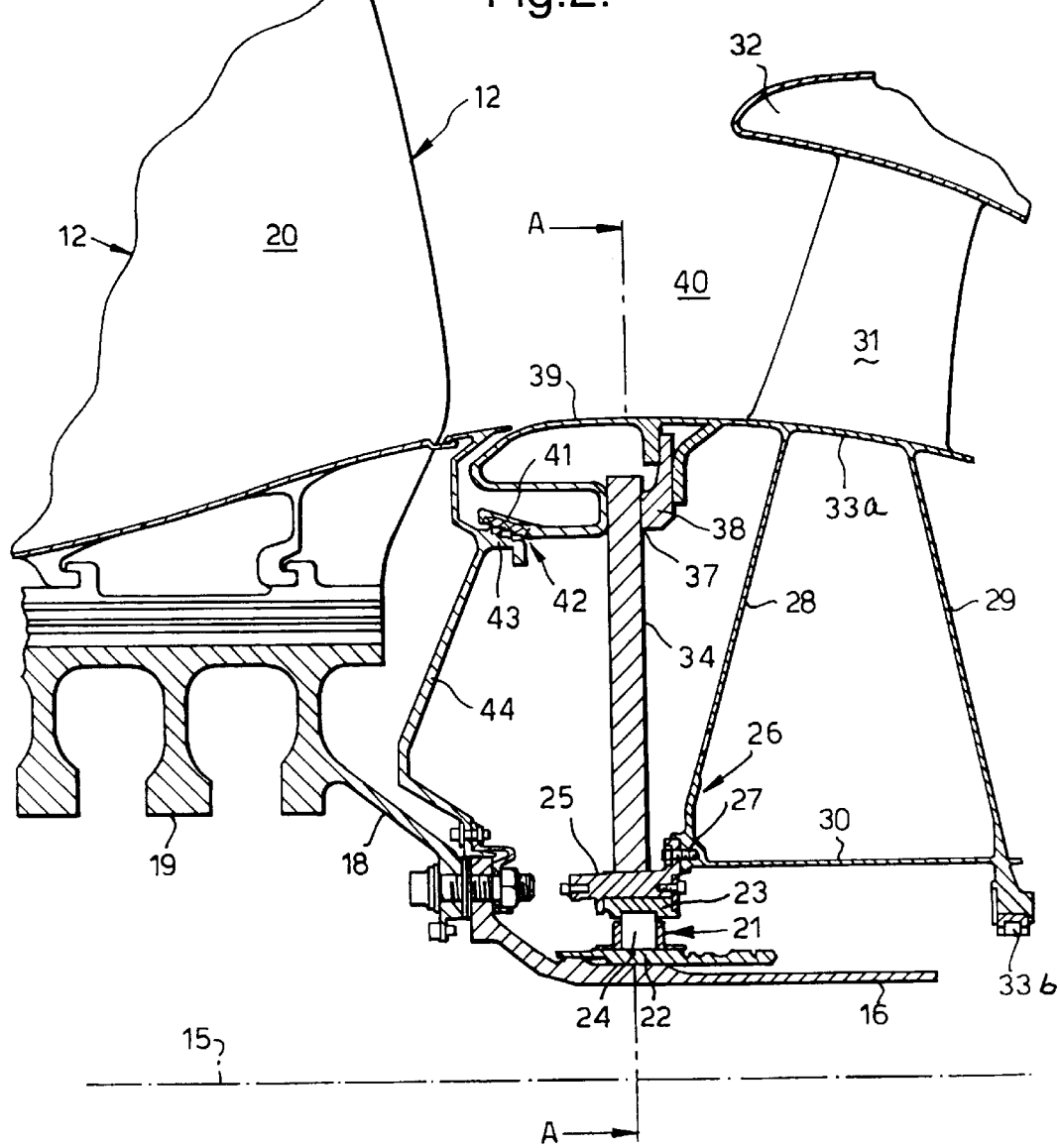
FIG. 2 is a sectioned side view on an enlarged scale of a portion of the ducted fan gas turbine engine shown in FIG. 1 in the region of its fan.

The manner in which the upstream region of the fan shaft 16 is supported from the fixed structure of the engine 10 can be seen if reference is now made to FIG. 2.

The fan shaft 16 extends almost the whole length of the gas turbine engine 10 in order to interconnect the fan 12 with the low pressure turbine 17 of the core engine 11. The fan shaft 16 is supported from the remainder of the core engine 11 by a number of roller bearings, one of which 21 supports the upstream end of the fan shaft 16. The roller bearing 21 comprises a radially inner race 22, which is located upon the external surface of the fan shaft 16, a radially outer race 23 and a plurality of roller bearing elements 24 which are interposed in an annular array between the inner and outer races 22 and 23.

The radially outer race 23 of the bearing 21 is carried by a support ring 25 which is attached to the fixed structure 26 of the core engine 11 by a plurality of fuse bolts 27, one of which can be seen in FIG. 2. The fixed structure 26 is constituted by two annular panels 28 and 29 which are axially spaced apart at their radially inner extents by a cylindrical part 30. Their radially outer extents are interconnected by an annular member configured to define the radially inner platforms 33a of an annular array of stator aerofoil vanes 31. The vanes 31 are attached, in turn, to the outer casing 32 of the core engine 11. The fixed structure 26 additionally supports a further bearing 33b which in turn supports a further engine shaft (not shown).

In the event of the fan 12 suffering damage to one or more of its aerofoil blades 20 which places it significantly out-of-balance, considerable radial loads are transmitted from the fan shaft 16 to the support ring 25 via the roller bearing 21. Those loads are then in turn transmitted to the core engine fixed structure 26 via the fuse pins 27. However, in order to protect the core engine 11 from being seriously damaged by the loads, the fuse pins 27 are designed so as to be frangible in such a manner that they fracture in shear when subjected to loads above a pre-determined magnitude. If this occurs, the upstream end of the fan shaft 16 no longer has radial support and so it proceeds to orbit around the engine longitudinal axis 15. This, in turn, results in the bearing support ring 25 following that orbiting motion. Conventionally, following major fan damage, the fuel flow to the engine 10 is discontinued and the fan 12 is allowed to run down to windmilling speed. However, at windmilling speeds, there is a likelihood of the fan 12 approaching its natural frequency of vibration which could result in the fan 12 vibrating to such an extent that the integrity of the engine 10 is threatened.

In order to modify the vibrational characteristics of the fan 12 under these circumstances, the longitudinal axis of the fan 12 and the fan shaft 16 is urged back towards a coaxial relationship with the engine longitudinal axis 15 so that the overall stiffness of the core engine 11 is restored. This is achieved by the application of a radial restoration force to the fan shaft 16.

Figure 3:
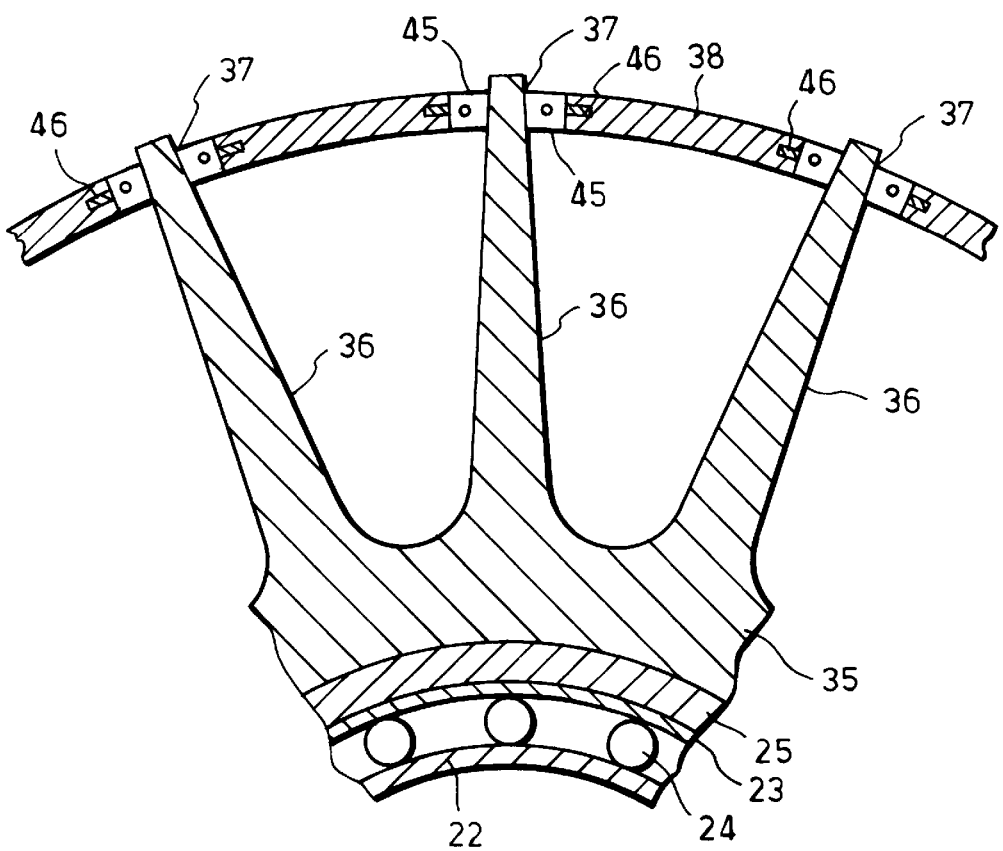
FIG. 3 is a view on Section line A—A of FIG. 2.

The radial restoration force is applied to the fan shaft 16 by means of a restoration member 34 which comprises a hub portion 35, as can be seen in FIG. 3, from which extends radially a plurality of equally spaced apart, radially tapered spokes 36. The radially outer extent of each spoke 36 slidingly locates in a radially extending aperture 37 partially defined by a ring member 38 which constitutes part of the engine fixed structure 26. The ring member 38 is supported by a modified portion 39 of the radially inner part of the air intake 40 of the core engine 11. The modified core engine intake portion 39 serves to define the remainder of the apertures 37.

The modified core engine intake portion 39 additionally defines one annular element 41 of a conventional labyrinth air seal 42. The remaining element 43 of the labyrinth seal 42 is defined by a carrier 44 which is attached to the downstream end of the fan shaft 16 adjacent the stub shaft 18. It will be understood, however, that in the event of the fan shaft 16 orbiting about the engine longitudinal axis, the carrier 44 and the seal 42 will be destroyed. Nevertheless, they are components which would be simple to replace during a subsequent engine overhaul.

As the fan shaft 16 orbits around the engine longitudinal axis 15, bending loads are imposed upon the spokes 36 of the restoration member 34. However, the restoration member 34 is manufactured from a material, such as a fibre reinforced composite material, which is chosen so that its spokes 36 are resilient in bending. Consequently, as the fan shaft 16 orbits around the engine longitudinal axis 15, the spokes 36, by virtue of their resilience and cooperation with the ring member 38, exert a radially inward restoration force upon the fan shaft 16 via the bearing 21 and its support ring 25. The radially inward restoration force applied by the restoration member 36 may not be sufficient in all situations to restore a coaxial relationship between the fan shaft 16 and the engine longitudinal axis 15. However, it can be arranged to be sufficiently large to alter the natural frequency of vibration characteristics of the fan 12 to such an extent that severe vibration at windmilling speeds is substantially reduced or avoided. This enables the aircraft carrying the engine 10 to fly on safely to a suitable airfield whereupon the engine 10 can be removed for repair.

Each of the apertures 37 in the ring member 38 is also partially defined by a pair of friction pads 45. The friction pads 45 of each pair are circumferentially biased towards each other into engagement with their associated spoke 36 by compression springs 46 which are located within appropriate housings located within the ring member 38. It will be seen, therefore, that each pair of friction pads 45 serves to resist any radial movement of its associated spoke 36 within its aperture 37. Such radial movement does, of course, occur in the event of the fan shaft 16 orbiting about the engine longitudinal axis 15. However, the resistance provided by the friction pads 45 serves to enhance the restoration effect provided by the restoration member 34. It will be appreciated, however, that the use of such friction pads 45 may not be necessary in all cases.

I claim:

1. A ducted fan gas turbine engine including a propulsive fan mounted on a shaft, which shaft is normally coaxial with said engine longitudinal axis, a bearing support structure, said fan shaft being supported radially by said bearing support structure, radially frangible connection means, said bearing support structure being in turn supported from fixed structure of said engine by said radially frangible connection means, and restoration means comprising a plurality of generally radially extending spokes interconnected at their radially inner extents by a common member which in turn engages said fan bearing support structure, each of said radially extending spokes slidingly engaging in a corresponding aperture in part of said engine fixed structure located radially outwardly of said fan bearing support structure, said spokes having sufficient resilience in bending as to ensure that they cooperate with said engine fixed structure to exert a radially inward restoration force upon said fan bearing support structure, and hence said fan shaft, subsequent to any radial excursion of at least part of said fan shaft relative to said engine longitudinal axis following any fracture of said frangible connection means.

2. A ducted fan gas turbine engine as claimed in claim 1 wherein apertures are at least partially defined by a common ring member.

3. A ducted fan gas turbine engine as claimed in claim 1 wherein friction pads are provided to engage said spokes and provide resistance to sliding movement of said spokes in their corresponding apertures.

4. A ducted fan gas turbine engine as claimed in claim 3 wherein said friction pads are spring biased into engagement with said spokes.

5. A ducted fan gas turbine engine as claimed in claim 3 wherein a pair of said friction pads are located within each one of said apertures in opposed relationship.

6. A ducted fan gas turbine engine as claimed in claim 1 wherein each of said spokes is radially tapered.

* * * * *